United States Patent [19]

Cho et al.

[11] Patent Number: 4,990,945
[45] Date of Patent: Feb. 5, 1991

[54] CAMERA OF CHANGEABLE FOCAL LENGTH

[75] Inventors: Michio Cho; Tokuji Sato; Ko Aosaki; Yasuhiro Nishitani, all of Tokyo, Japan

[73] Assignee: Fuji Photo Film Co., Ltd., Kanagawa, Japan

[21] Appl. No.: 392,374

[22] Filed: Aug. 10, 1989

[30] Foreign Application Priority Data

Aug. 13, 1988 [JP] Japan .................................. 63-202129
Sep. 16, 1988 [JP] Japan .................................. 63-231519

[51] Int. Cl.$^5$ .............................................. G03B 1/18
[52] U.S. Cl. ................................. 354/195.12; 354/429
[58] Field of Search ................. 354/195.1, 195.12, 199, 354/222; 350/255, 429

[56] References Cited

U.S. PATENT DOCUMENTS 4,757,372  7/1988  Betensky et al. .......... 354/195.12 X

FOREIGN PATENT DOCUMENTS 61-259237  11/1986  Japan .

Primary Examiner—Brian W. Brown
Attorney, Agent, or Firm—Young & Thompson

[57] ABSTRACT

A camera has a lens system changeable as to focal length, which is driven by a driving device so as to change the focal length thereof. The driving mechanism includes a first shifting mechanism for shifting one lens of the lens system stepwise to predetermined positions in a direction parallel to the optical axis of the lens system and a second shifting mechanism for shifting another lens of the lens system stepwise with respect to the one lens in that same direction, thereby changing the focal length of the lens system.

13 Claims, 5 Drawing Sheets

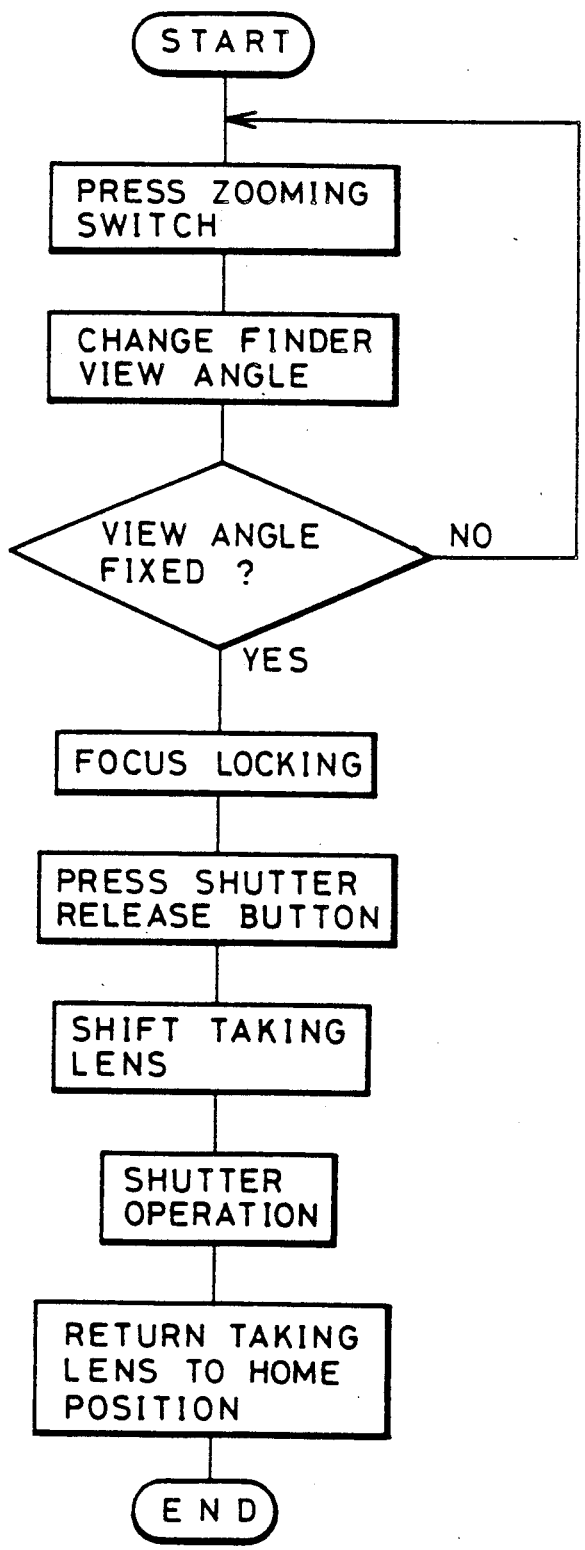

CAMERA OF CHANGEABLE FOCAL LENGTH

BACKGROUND OF THE INVENTION

The present invention relates to a camera of changeable focal length, and more particularly to a camera equipped with a taking lens which is changeable as to focal length.

Recent compact cameras are equipped with zoom lens systems. To change the focal length, such a zoom lens system includes a cam cylinder driving a movable lens component of the zoom lens system, thereby changing the focal length thereof.

It is difficult to make the cam cylinder with high precision but low cost. To remedy this; it is possible to provide a taking lens system which is changeable between only two different focal lengths. Although such a taking lens system, which usually comprises a combination of a master and a conversion lens, needs no cam cylinder and so can be provided at lower cost, it is impossible to change the focal length progressively as in zoom lens systems.

Compact cameras having zoom lens systems, in particular motor driven zoom lens systems, are provided with zoom finders of which the focal length is changed upon changing the focal length of the zoom lens system, thereby matching the field of view of the finder system with that of the zoom lens system. Upon taking a picture, it is almost certain that zooming will take place in order to find the most suitable field of view for the zoom lens system. This drives the motor so frequently that the battery is soon run down.

OBJECTS OF THE INVENTION

It is, therefore, an object of the present invention to provide a camera with a taking lens system which is, although progressively changeable in focal length as is a zoom lens, less costly.

It is another object of the present invention to provide a camera with a motor-driven taking lens which consumes less of the power of a battery.

SUMMARY OF THE INVENTION

The above and other objects of the present invention are achieved by providing a camera with a lens system of changeable focal length, including movable lenses driven by driving means according to the present invention to change the focal length of the lens system. The driving means comprises first lens shifting means for shifting at least one component lens of the lens system to predetermined stepwise positions in a direction parallel to the optical axis of the lens system, and second lens shifting means for shifting at least another component lens of the lens system stepwise with respect to the one component lens in the same direction, thereby changing the focal length of the lens system.

According to another preferred embodiment of the present invention, the camera is further provided with a finder optical system of changeable focal length, including at least one lens movable in the axial direction to change the focal length of the finder optical system. The axially displaced positions of the at least one lens are detected by position detecting means which provides a position signal indicating the changed focal length of the finder optical system. The focal length of the taking lens system is then changed by the focal length changing means according to that position signal in cooperation with a shutter release member.

BRIEF DESCRIPTION OF THE DRAWINGS

FIG. 5 is a flow chart illustrating the sequential operation of the embodiment in accordance with the present invention for changing the focal length of the zoom lens for photographing in cooperation with the shutter release.

DETAILED DESCRIPTION OF THE INVENTION

Figure 1:
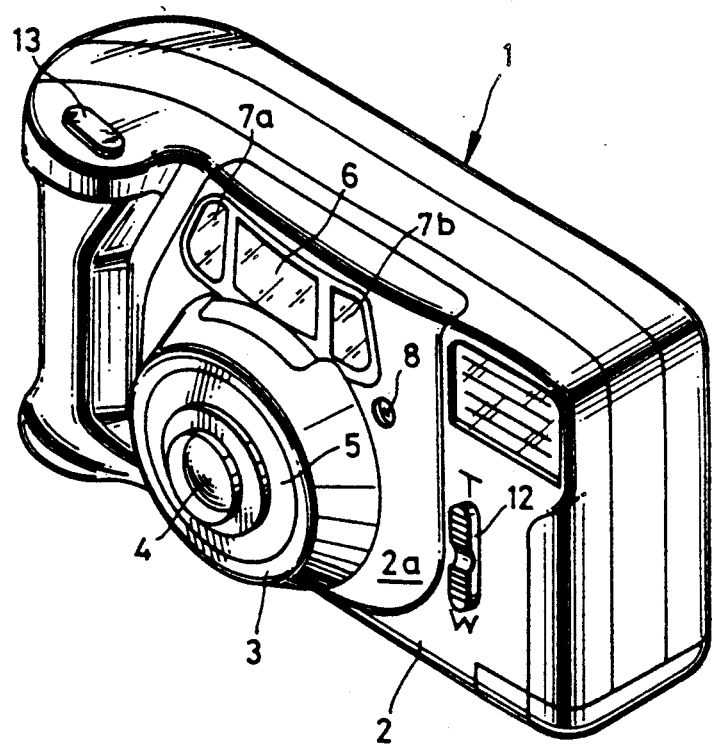
FIG. 1 is a perspective view showing the outer appearance of a camera in accordance with a preferred embodiment of the present invention.
Figure 2:
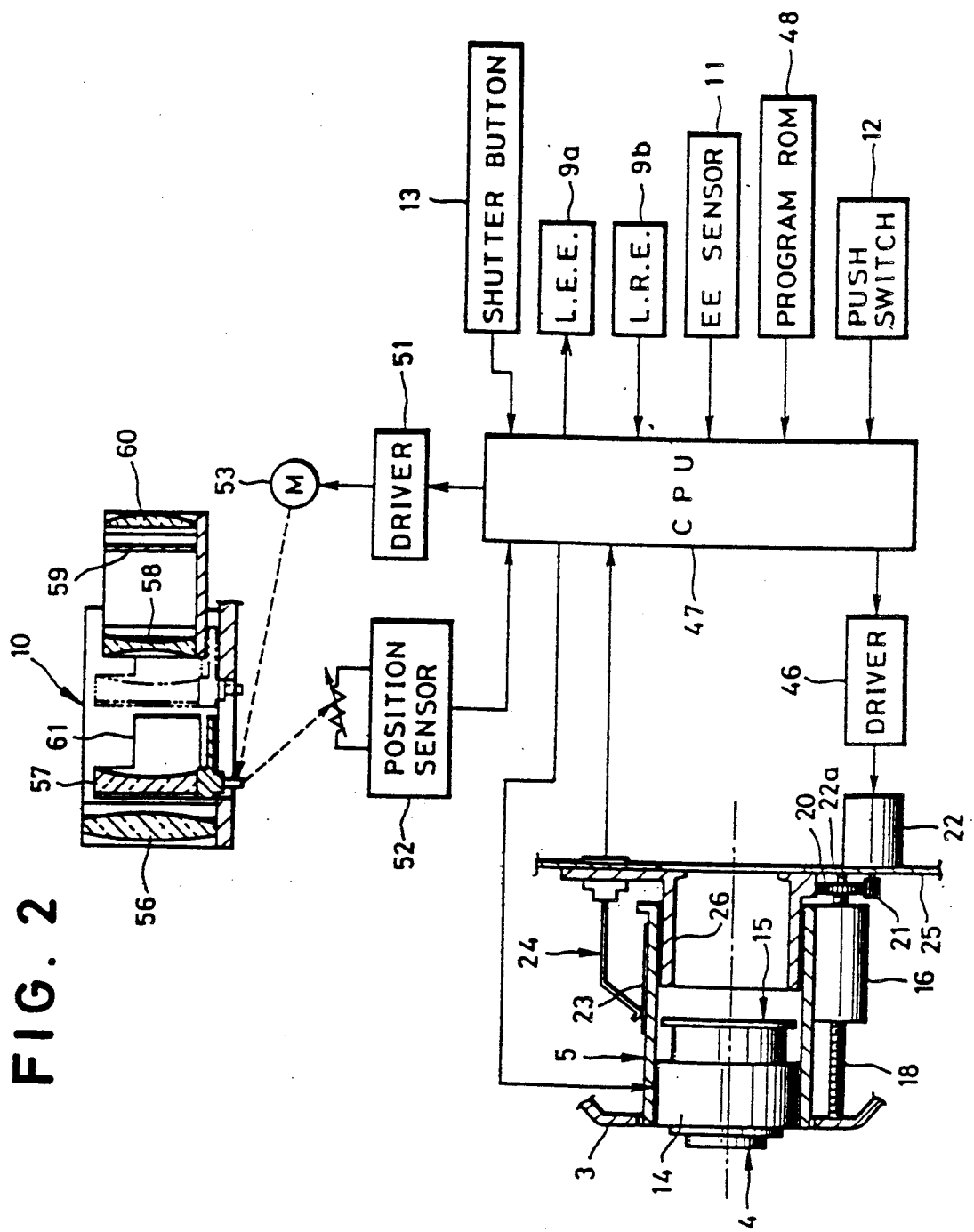
FIG. 2 is a schematic illustration showing essential components of the camera shown in FIG. 1.

Referring to the drawings, in particular to FIGS. 1 and 2, a compact camera 1 is shown, incorporating a motordriven lens system that is changeable as to focal length and that comprises a taking lens. A camera body 2 of the compact camera 1 has a lens housing 3 fixedly attached to or integrally formed with the front wall 2a thereof. The lens housing 3 axially slidably receives therein a lens barrel 5 holding a zoom lens 4. A zoom finder system 10 (see FIG. 2), which is incorporated in the camera body 2, has a finder window 6 disposed above the lens housing 3. The camera 1 is provided with an active-type automatic focusing device, which has a pair of windows 7a and 7b on opposite horizontal sides of the finder window 6 for distance measurement and a window 8 for light measurement, all these windows 7a, 7b and 8 being disposed in the front wall 2a of the camera body 2 just above or beside the lens housing 3. Behind these windows 7a and 7b there are a light emitting element (L.E.E.) 9a and a light receiving element (L.R.E.) 9b disposed in the camera body 2. Behind the window 8 there is EE sensor 11, such as a silicon photo diode (SPD), for detecting subject brightness. Such automatic focusing devices and light measurement devices are well known in the art and do not form directly any part of the present invention, and so need not be described in detail herein.

A push switch 12 is disposed on the front wall 2a of the camera body 2. This push switch 12, usually in a neutral position as shown in FIG. 1, is pushed up toward a sign "T" indicating telephotography so as to drive a motor in order to change the zoom finder system 10 suitably for telephotography or pushed down toward a sign "W" indicating wide-angle photography so as to drive the motor in order to change the zoom finder system 10 suitably for wide-angle photography. Denoted by a reference numeral 13 is a shutter actuating button which is well known in the art.

Figure 3:
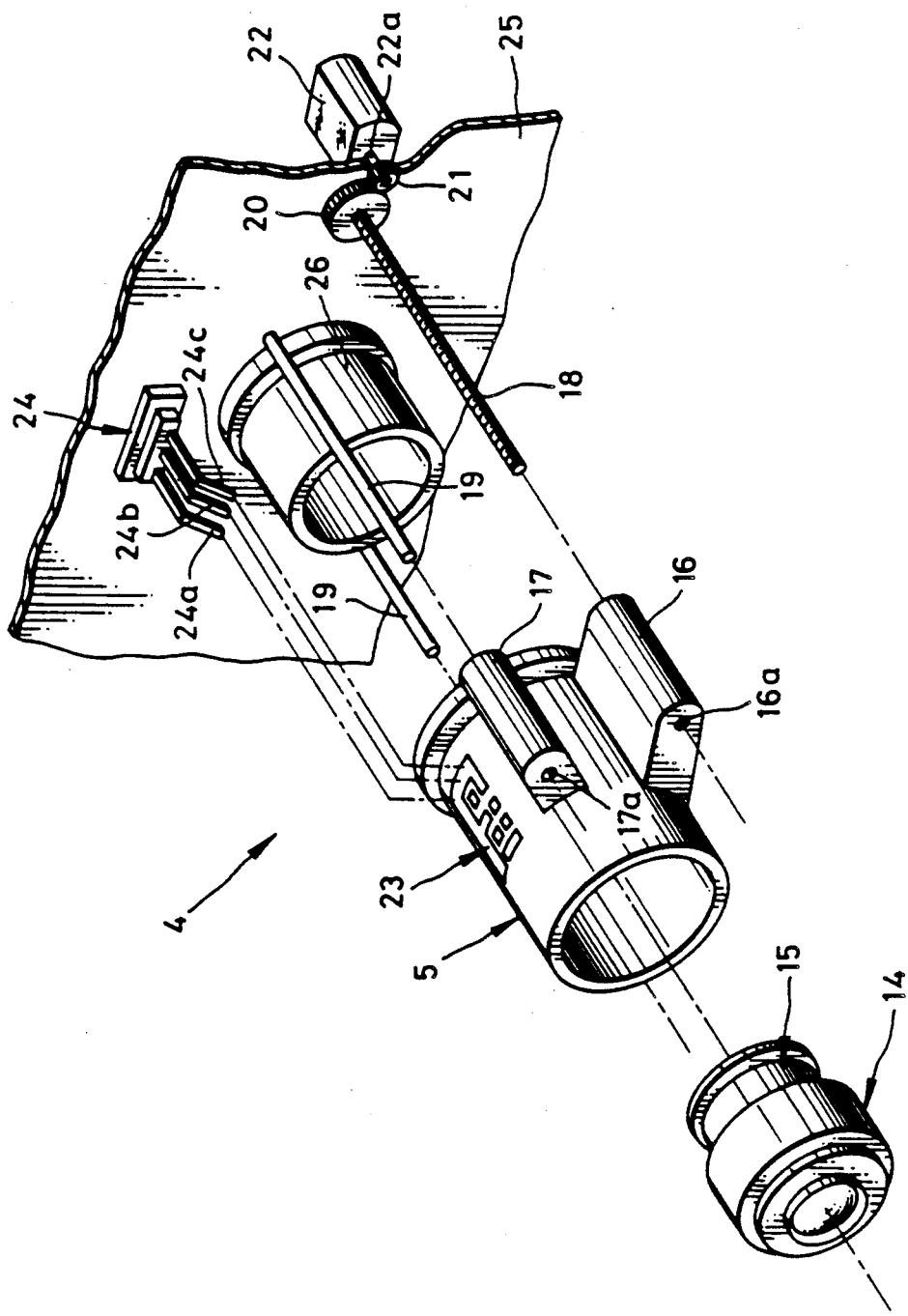
FIG. 3 is a exploded perspective view of a zoom lens of the camera shown in FIG. 1.

Referring now to FIG. 3, the zoom lens system 4 comprises generally a front unit 14 and a rear unit 15 received in the lens barrel 5 which is slidably movable for zooming. The front unit 14 includes a focusing lens and a correction lens for correcting the change of focus due to zooming. The rear unit 15 includes a conversion lens. A partition wall 25 is disposed between the zoom lens system 4 and a film chamber (not shown) and fixedly supports a light shielding barrel 26 on which the lens barrel 5 is slidably mounted.

The lens barrel 5 is provided with an axially extending guide block 16 fixed to an outer surface thereof. The guide block 16 has an axially extending hole 16a formed with female threads engageable with a screw rod 18. The screw rod 18 is supported for rotation by and between the lens housing 3 and the partition wall 25. The screw rod 18 has fixed on one end thereof a gear 20 in mesh with pinion gear 21 secured to an output shaft 22a of a motor 22 mounted on the rear of the partition wall 25. When the motor 22 rotates shaft 25a, the screw rod 18 turns as to move the lens barrel 5 back and forth in the axial direction. The lens barrel 5 is further provided with a pair of guide blocks 17 (one of which is hidden) having axial holes 17a. The guide blocks 17 slidably receive guide rods 19 secured to the partition wall 25 and extending axially in parallel with each other forwardly from the partition wall 25 so as to ensure the smooth axial movement of the lens barrel 5.

The outer surface of the lens barrel 5 carries a contact plate 23. A slidable contact 24 secured to the partition wall 25 has a plurality, for example in this embodiment three, of contact brushes 24a-24c in slidable contact with the contact plate 23 so as to output an appropriate signal representing the axial position of the lens barrel 5. In more detail, the contact plate 23 is patterned to create four different conductive couplings among the contact brushes 24a-24c, namely: between contact brushes 24b and 24c, between contact brushes 24a and 24b, between contact brushes 24a and 24c, or between contact brushes 24a, 24b and 24c, and a fifth non-conductive state. Therefore, the slidable contact 24 can detect five different axial positions of the lens barrel 5.

Figure 4:
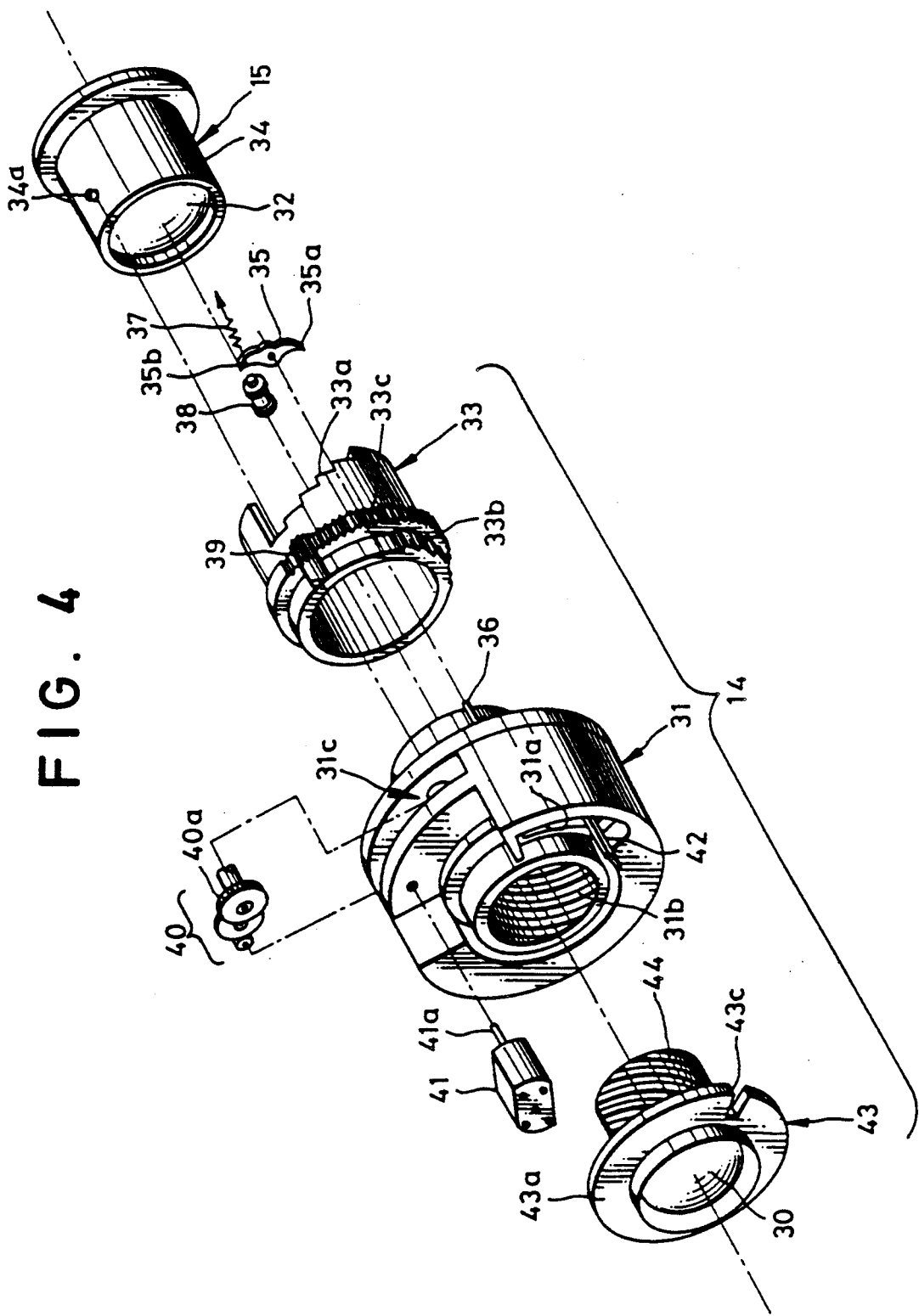
FIG. 4 is an exploded perspective view of a front lens unit of the zoom lens shown in FIG. 3.

Referring to FIGS. 4, the front unit 14 is shown in detail, consisting of three cylindrical barrels: a first lens holding barrel 43, a shutter holding barrel 31 and a cam barrel 33. The first lens holding barrel 43, which holds therein a focusing or first lens 30, is formed with an integral flange 43a having a radial notch 43c and male helicoidal threads 44. The shutter holding barrel 31, which incorporates a shutter mechanism, is formed with female helicoidal threads 31b which mesh with the male helicoidal threads 44 of the first lens holding barrel 43. The cylindrical cam barrel 33, which is of molded plastic, has a control cam section 33a consisting of a plurality of steps formed on the rear end thereof. The control cam section 33a is engaged by a pin 34a of a second lens holding barrel 34 holding a second lens 32. When the cam barrel 33 turns, the second lens holding barrel 34 is axially shifted stepwise so as to focus an image on a film. The cam barrel 33 is formed with a ratchet gear 33b and a gear 33c on the front periphery thereof. The ratchet gear 33b is engaged by a claw 35a of a pawl 35 rotatably mounted on a shaft 36 fixed to the shutter holding barrel 31. The pawl 35 is urged by a spring 37 in a clockwise direction as viewed in FIG. 4 so as to bring the claw 35a into engagement with the ratchet gear 33b, thereby preventing the cam barrel 33 from turning in a counterclockwise direction.

An electromagnetic actuator 38 is disposed near the pawl 35 facing the end 35b of the pawl 35 opposite the claw 35a. When the electromagnetic actuator 38 is energized, it attracts the end 35b of the pawl 35 to turn pawl 35 in the counterclockwise direction against the action of spring 37, thereby allowing the ca barrel 33 to turn in the counterclockwise direction. The energization of the electromagnetic actuator 38 is caused by outputs from the slidable contact 24 in accordance with positions of the lens barrel 5.

The gear 33c is in mesh with a pinion gear 39 of which an end is coupled to one gear 40a of a gear train 40 housed in a chamber 31c formed in the shutter holding barrel 41. The gear train 40 is connected to an output shaft 41a of an inexpensive miniature DC motor 41. When the motor 41 rotates, the cam barrel 33 is turned through the gear train 40.

The shutter holding barrel 31 is provided with a displacing mechanism for moving the first lens holding barrel 43 back and forth. Such a displacing mechanism is well known in the art and need not be shown in the figure and explained herein. A lever, which is movable around the optical axis of the zoom lens system 4 in cooperation with the displacing mechanism, extends axially passing through a circumferential opening 31a of the shutter holding barrel 31 and is received at the front end thereof in the radial notch 43c.

Referring again to FIG. 2, the zoom finder system 10 consists of an objective lens 56, a converter lens 57, a correction lens 58, a reticle 59 and an eyepiece 60. The converter lens 57 is held by a lens holder 61 which is axially movable back and forth by means of a motor 53 so as to change the focal length of the finder system 10. The lens holder 61 is associated with a position sensor 52 which is, for example, a potentiometer and provides an appropriate signal in accordance with the axial position of the lens holder 61.

CPU 47 including a microcomputer is connected to outputs of the photoelectric element 9b, the EE sensor 11, the push switch 12, the shutter button 13, the slidable contact 24 and the position sensor 52 and outputs control signals to the light emitting element 9a, the driver 46 for controlling the motor 22 to move the lens barrel 5, and a driver 51 for the motor 53. The CPU 47 is operated under the control of a sequential program stored in ROM 48.

Programming a computer is a skill well understood in the art. The following description is given to enable a programmer having ordinary skill in the art to prepare an appropriate program for the microcomputer of the CPU 47. The particular details of any such program would of course depend upon the architecture of the particular computer selected.

The operation of the camera shown in FIGS. 1 through 4 is described as follows: after loading a film in the camera 1, and while viewing a subject to be photographed through the zoom finder system 10, the push switch 12 is pressed so as to change the zoom lens in focal length. That is, when pressing the push switch 12 toward the sign "T", the CPU 47 provides the driver 46 with a control signal so as to cause the motor 22 to start its rotation. The rotation of the motor 22 is transmitted to the screw rod 18 through the idler gear 20, thereby moving the lens barrel 5 forwardly in the lens housing 3.

Simultaneously, the CPU 47 energizes the electromagnetic actuator 38 so as to attract and turn the pawl 35 in the counterclockwise direction, thereby releasing the pawl 35 from the cam barrel 33, so as to allow the cam barrel 33 to turn in the counterclockwise direction. Then, the motor 41 starts its rotation. The rotation of the motor 41 is transmitted to the cam barrel 33 through the gear train 40, the pinion gear 39 and the peripheral gear 33c, turning the cam barrel 33.

As the lens barrel 5 moves axially forwardly, the contact plate 23 shifts in position with respect to the slidable contact 24. Upon a desirable focal length of the zoom lens system 4 being reached, the push switch 12 is released so as to stop the motor 22. At the position where the lens barrel 5 stops, the slidable contact 24 provides an appropriate position signal in accordance with the contact pattern between the contact plate 23 and the contact brushes 24a-24c of the slidable contact 24. If any one of the contact brushes 24a-24c of the slidable contact 24 is not in contact with the contact plate 23, the motor 22 continues to rotate until a contact pattern is created and then motor 22 stops. The CPU 47 compares the position signals from the slidable contact 24 of the zoom lens system 4 and the position sensor 52 of the zoom finder system 10. At the moment the CPU 47 detects the coincidence of these position signals, it provides the electromagnetic actuator 38 and the motor 41 with respective control signals, thereby deenergizing them. As a result, the claw 35a of the pawl 35 is brought by spring 37 into engagement with the ratchet gear 33b of the cam barrel 33, so as to prevent the cam barrel 33 from turning further. In this manner, the cam barrel 33 places the second lens holder 34 in a position wherein the zoom lens system 4 has the desired focal length.

When the shutter button 13 is depressed half way, the CPU 47 causes the automatic focusing device, namely the light emitting element 9a, to project light toward the subject and the light receiving element 9b to receive the reflected light from the subject, thereby detecting the subject distance to provide a distance signal. The CPU 47 actuates the automatic focusing device to adjust and lock the zoom lens system 4 so as to form a focused subject image on the film. After framing, when the shutter button 13 is fully depressed, the CPU 47 operates the shutter mechanism to make a proper exposure based on an output from the EE sensor 11. After the exposure, the zoom lens system 4 is returned to its home position, for example a position wherein the zoom lens system 4 is adjusted suitably for wide-angle photography.

It is to be noted that the lens barrel 5 can be manually shifted stepwise and that any type of optical system of the zoom lens system can be used.

It is further to be noted that the objective lens 56 may be shifted to change the focal length of the optical system of the zoom finder system and that the shiftable converter lens 57 or the objective lens 56 may be moved either manually or electrically.

In the above-described embodiment, the focal length of the zoom finder 10 is changed by actuating the push switch 12. The focal length of the zoom lens system 4 is changed stepwise in accordance with the change in the focal length of the zoom finder 10. It is possible that the battery used in this embodiment will be rapidly discharged, since the zoom lens system 4 is activated even during a framing operation. To solve this problem, the focal length of the zoom lens system (taking lens) 4 can be changed preferably just before photographing, as in shown in the flow chart of FIG. 5. In the embodiment shown in FIG. 5, the focal length of the zoom finder 10 is changed by actuating the zoom switch (push switch similarly to the above-described embodiment. Upon half-depressing the release button 13 after having set the zoom finder 10 at a desired view angle, the automatic focusing device is activated so as to lock the focusing of the zoom lens system 4. Upon fully depressing the shutter bottom 13, the focal length of the zoom lens system 4 is changed in accordance with the view angle, i.e. focal length of the zoom finder. After the activation of the zoom lens system 4, the shutter is operated so that the object image is photographed through the zoom lens system 4 on the film. The zoom lens system 4 returns to its home position after taking the photograph.

By using a cam barrel 33 having a stepped control cam section 33a, the focal length of the zoom lens system 4 can be precisely changed stepwise although employing an inexpensive miniature DC motor.

Although the present invention has been fully described by way of the preferred embodiment thereof with reference to the accompanying drawings, it is to be noted that various changes and modifications will be apparent to those skilled in the art. Therefore, unless otherwise these changes and modifications depart from the scope of the present invention, they should be construed as included therein.

What is claimed is:

1. A camera with a lens system that is changeable as to focal length and which is driven by driving means so as to change the focal length thereof, said driving means comprising:

first lens shifting means for shifting at least one component lens of said lens system stepwise to predetermined positions in a direction parallel to the optical axis of said lens system, said first lens shifting means comprising driving means including a first driving motor for linearly moving said at least one component lens and stopping means for stopping said first driving motor when said at least one component lens reaches any one of said predetermined axial positions; and second lens shifting means comprising a second driving motor for shifting at least another component lens of said lens system stepwise with respect to said at least one component lens in said direction according to said predetermined stepwise axial positions, thereby changing the focal length of said lens system.

2. A camera as defined in claim 1, wherein said second shifting means further comprises a cam barrel formed with a plurality of cam steps driven by said second driving motor, and a cam follower fixedly coupled to said at least another component lens, said second driving motor being stopped by said stopping means when said at least one component lens reaches any one of said predetermined axial positions.

3. A camera as defined in claim 1, wherein said first motor is actuated by a two-way switch to turn selectively in either direction.

4. A camera as defined in claim 2, wherein said cam steps are formed by cutting of an outer surface of said cam barrel in a stair-stepped sequence.

5. A camera as defined in claim 2, wherein said second driving motor is disposed in a movable lens barrel which can move along said optical axis in a fixed lens housing, said cam steps are displaced upon rotation of said cam barrel around said optical axis by said second driving motor so as to selectively engage one of said cam steps with said cam follower, and said other component lens is thereby shifted stepwise along the optical axis.

6. A camera as defined in claim 1, wherein said at least one component lens comprises a finder optical system including at least one lens means movable in said direction to change the focal length of said finder optical system, position detecting means for detecting axial positions of said at least on lens means to provide a position signal indicating the changed focal length of said finder optical system, and said at least another component lens comprising a taking lens, said second lens-shifting means changing the focal length of said taking lens responsive to said position signal and to the actuation of a shutter release member.

7. A camera as define din claim 6, wherein said second shifting means further comprises a cam barrel formed with a plurality of cam steps driven by said second driving motor, and a cam follower fixedly coupled to said at least another component lens, said second driving motor being stopped by said stopping means when said at least one component lens reaches any one of said predetermined axial positions.

8. A camera as defined in claim 7, wherein said cam steps are formed by cutting off an outer surface of said cam barrel in a stair-stepped sequence.

9. A camera as defined in claim 7, wherein said second driving motor is disposed in a movable lens barrel which can move along said optical axis in a fixed lens housing, said cam steps are displaced upon rotation of said cam barrel around said optical axis by said second driving motor so as to selectively engage one of said cam steps with said cam follower, and said other component lens is thereby shifted stepwise along the optical axis.

10. A camera with a taking lens system changeable as to focal length comprising:
   a finder optical system including at least one lens means movable in a direction parallel to the optical axis of said taking lens system to change the focal length of said finder optical system;
   position detecting means for detecting axial positions of said at least one lens means to provide a position signal indicating the changed focal length of said finder optical system; and
   focal length changing means for changing the focal length of said taking lens responsive to said position signal and to the actuation of a shutter release member;
   said focal length changing means includes driving means for changing the focal length thereof, said driving means comprising:
   first lens shifting means for shifting at least one component lens of said lens system stepwise to predetermined positions in a direction parallel to the optical axis of said lens system;
   second lens shifting means for shifting at least another component lens of said lens system stepwise with respect to said at least one component lens in said direction according to said predetermined stepwise axial positions, thereby changing the focal length of said lens system;
   said first lens shifting means comprising driving means including a first driving motor for linearly moving said at least one component lens and stopping means for stopping said first driving motor when said at least one component lens reaches nay one of said predetermined axial positions; and
   said second shifting means comprising a second driving motor, a cam barrel formed with a plurality of cam steps driven by said second driving motor, and a cam follower fixedly coupled to said at least another component lens, said second driving motor being stopped by said stopping means when said at least one component lens reaches any one of said predetermined axial positions.

11. A camera as defined in claim 10, wherein said first motor is actuated by a two-way switch to turn selectively in either direction.

12. A camera as define din claim 10, wherein said cam steps are formed by cutting off an outer surface of said cam barrel in a stair-stepped sequence.

13. A camera as define din claim 10, wherein said second driving motor is disposed in a movable lens barrel which can move along said optical axis in a fixed lens housing, said cam steps are displaced upon rotation of said cam barrel around said optical axis by said second driving motor so as to selectively engage one of said cam steps with said cam follower, and said other component lens is thereby shifted stepwise along the optical axis.

* * * * *